United States Patent
Oshikawa et al.

(10) Patent No.: US 7,475,265 B2
(45) Date of Patent: Jan. 6, 2009

(54) DATA STORAGE DEVICE AND CONTROL METHOD FOR POWER-SAVING MODES OF SERIAL INTERFACE THEREOF

(75) Inventors: Hiroshi Oshikawa, Kanagawa (JP); Hirofumi Saitoh, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 504 days.

(21) Appl. No.: 11/227,676

(22) Filed: Sep. 14, 2005

(65) Prior Publication Data

US 2006/0069932 A1   Mar. 30, 2006

(30) Foreign Application Priority Data

Sep. 30, 2004 (JP) .............................. 2004-287820

(51) Int. Cl.
*G06F 1/32* (2006.01)
(52) U.S. Cl. ...................... 713/320; 713/323
(58) Field of Classification Search ................ 713/300, 713/320, 323, 324
See application file for complete search history.

(56) References Cited

U.S. PATENT DOCUMENTS

| 5,781,782 A * | 7/1998 | Tachikawa ................... 713/330 |
| 6,373,904 B1 * | 4/2002 | Sakamoto et al. ............ 375/316 |
| 2005/0010831 A1 * | 1/2005 | Bashford et al. ............. 713/323 |
| 2005/0235171 A1 * | 10/2005 | Igari .......................... 713/323 |

FOREIGN PATENT DOCUMENTS

JP     2000-173152     6/2000

* cited by examiner

*Primary Examiner*—Chun Cao
(74) *Attorney, Agent, or Firm*—Townsend and Townsend and Crew LLP; Patrick Duncan

(57) ABSTRACT

Embodiments of the invention reduce consumption power of a data storage device. In one embodiment, an HDD according to the embodiment selectively switches a serial interface among other circuits to a power-save mode. The HDD receives a command from a host, and, in a command execution sequence thereof, sets and keeps the serial interface in the power-save mode for at least a partial period of time during which no sending and receiving of data resulting from serial data communication with the host exists. Further, in responding to completion of execution of the command, the HDD switches the serial interface to the power-save mode.

12 Claims, 9 Drawing Sheets

DATA STORAGE DEVICE AND CONTROL METHOD FOR POWER-SAVING MODES OF SERIAL INTERFACE THEREOF

CROSS-REFERENCES TO RELATED APPLICATIONS

This application claims priority from Japanese Patent Application No. JP2004-287820, filed Sep. 30, 2004, the entire disclosure of which is incorporated herein by reference.

BACKGROUND OF THE INVENTION

The present invention relates to a control method for power-save modes of a serial interface of a data storage device that executes serial data communication.

Devices using various types of media such as optical disks and magnetic tapes are known as information recording and reproducing devices. Among them, hard disk drives (HDDs) have become popular as storage devices for computers to such an extent that they are one of the storage devices indispensable for today's computers. Further, not limited to computers, their application is widening more and more due to the superior characteristics with the advent of moving picture recording/reproducing devices, car navigation systems, removable memories for digital cameras and so on.

Each magnetic disk used in HDDs has a plurality of tracks formed concentrically and each track is partitioned into a plurality of sectors. In each sector, sector address information and user data are stored. Either data write to a sector or data read from the sector is enabled by a head element which accesses the desired sector according to the sector address information. A signal read out from a magnetic disk in a data read process is subjected to waveform shaping, decoding processing and other prescribed signal processing by a signal processing circuit before transmitted to a host. Likewise, data transferred from the host is subjected to prescribed signal processing by a signal processing circuit and then written to the magnetic disk.

For an interface to transmit data between the host and the HDD, such protocols as the SCSI interface or the ATA interface are used in general. In particular, the SCSI interface is used for many computers from the viewpoint of improved functions and economical cost of the interface, and it is also used as an interface for other types of storage devices such as an optical disk storage device. In a quest for improved recording density of recording media and improved performance, requirements for data transfer speed of ATA interfaces are becoming increasingly severe.

For the above-stated reasons, an ATA interface using serial data transfer has been proposed as a substitute for the conventional transmission system using parallel data transmission. The Serial ATA (SATA) standard is being formulated by the Serial ATA Working Group and is stated in detail, for example, in the Specifications (Non-patent Document 1, "Serial ATA: High Speed Serialized ATA Attachment Revision 1.0a" [Retrieved on Sep. 23, 2004] The Internet <URL: http://www.sata-io.org/specifications.asp>) prepared by the Serial ATA Working Group.

On the other hand, to reduce consumption power in HDDs, various power management methods have been proposed (for example, refer to the Patent Document 1, Japanese Patent Laid-open No. 2000-173152). Typically, an HDD is provided with a plurality of power-save mode, and switching is made to the prescribed power-save mode according to the number of commands from the host in a given period of time. In addition, for the SATA, power-save modes for serial interface have been proposed. For the power-save modes, two modes are proposed according to time required for recovery, that is, the Partial mode having shorter recovery time and the Slumber mode having longer recovery time.

BRIEF SUMMARY OF THE INVENTION

As stated above, the power-save mode of the serial interface is specified for the SATA. However, the specification only designates recovery time from the power-save mode, and it specifies no specific suspend circuit or shifting timing to the power-save mode, etc. For this reason, it is necessary to reduce consumption power more efficiently by controlling the power-save mode of the serial interface effectively.

The present invention is achieved in view of the above-described background, and a feature of the invention is to improve power management of a serial interface of data storage devices such as HDDs and optical disk players.

A first aspect of the present invention is a method of controlling the power-save mode of the serial interface in a data storage device which preferentially switches a serial interface to a power-save mode. The method includes receiving a command, executing the received command, and switching the serial interface to the power-save mode in responding to completion of command execution, whereby enabling reduction in a greater amount of consumption power, while suppressing effects on throughput.

Preferably, when the reference time has elapsed from the switching to the power-save mode without receiving the next command, the serial interface is switched to a second power-save mode which requires longer reset time than that of the power-save mode. Such arrangement enables further reduction in consumption power. Here, the reference time can be a pre-registered given period of time.

A second aspect of the present invention is a method of controlling a power-save mode of a serial interface in a data storage device that preferentially switches the serial interface to the power-save mode. The method includes receiving from a host, identifying content of the command, and setting the serial interface to the power-save mode for at least a period of time during which no sending and receiving of data through serial data communication with the host exists in an execution sequence that is performed in accordance with content of the command. The serial interface is thus set to the power-save mode for a period of time during which serial data communication is not conducted in the command execution sequence. This makes it possible to effectively reduce consumption power while suppressing effects on throughput.

Preferably, the command is a command that does not accompany sending and receiving of user data to and from the host, and the serial interface is switched to the power-save mode in responding to reception of the command.

In some embodiments, the command is a read command adapted to read out read data from the data storage device, and the serial interface is switched to the power-save mode for at least a partial period of time from reception of the read command to movement of a head to the target address of a recording medium on which the read data is recorded. Further, in terms of reducing consumption power, it is preferred that the serial interface be switched to the power-save mode after receiving the read command, and then, the serial interface be switched to the active mode from the power-save mode after the head arrives at the track of the target address.

In specific embodiments, the command is a write command adapted to write write data on a recording medium of the data storage device, and the serial interface is switched to the power-save mode for at least a partial period of time from completion of the write data reception to completion of writing the write data on the recording medium. Further, in terms of reducing consumption power, it is preferred that the serial interface be switched to the power-save mode after completion of the write data reception, and then, after completion of writing the write data on the recording medium, the serial interface be switched to the active mode from the power-save mode.

In the execution sequence of the write command, if a write cache is OFF, the serial interface is switched to the power-save mode. Alternatively, in the execution sequence of the write command, if the write cache is ON and no free space is available in at least one of a buffer adapted to temporarily store the write data and a queue allocated to the write cache.

A third aspect of the present invention is a data storage device, which executes sending and receiving of data through serial data communication to and from a host, and which includes a serial interface which interfaces serial data communication with the host and is preferentially switched to a power-save mode, and a controller which identifies content of the command received from the host and controls a command execution sequence. In an execution sequence in accordance with the command, the serial interface is set to the power-save mode for at least a partial period of time during which no sending and receiving of data through serial data communication with the host exists. The serial interface is switched to the power-save mode in responding to a command complete. This makes it possible to reduce a greater amount of power consumption while suppressing effects on throughput.

The serial interface may be switched to the power-save mode in responding to reception of a command which does not accompany sending and receiving of user data to and from the host.

It is preferred that the serial interface be set to the power-save mode for at least a partial period of time from reception of the read command adapted to read out read data from the data storage device to movement of a head to the target address of a recording medium on which the read data is recorded. Further, when the read data associating with the read command received is stored in a cache, it is preferable that the serial interface be retained in the active mode and transmits the data transferred from the cache to the host. With such arrangement, it is possible to reduce decrease in throughput.

In an execution sequence of the write command for writing data, the serial interface may be set to the power-save mode for at least a partial period of time from completion of the write data reception to completion of writing the write data on a recording medium.

In the execution sequence of the write command, it is preferable that, if a write cache is OFF, the serial interface be set to the power-save mode for at least a partial period of time from completion of the write data reception to completion of writing the write data on a recording medium. While, if a write cache is ON, there is a free space in the buffer adapted to temporally store write data and further there is a free space in a queue of the write cache, it is preferable that the serial interface be retained in the active mode in the write command execution sequence. With such arrangement, it is possible to achieve a balance between throughput and reduction in consumption power.

A fourth aspect of the present invention is a data storage device, which executes sending and receiving of data through serial data communication to and from a host. The data storage device includes a serial interface which interfaces serial communication with the host and is switched to the power-save mode independently from other circuits, and a controller which identifies the content of the command received from the host and controls a command execution sequence. The serial interface is switched to the power-save mode in responding to the execution completion of the command. The serial interface is thus switched to the power-save mode in responding to the command complete. This makes it possible to reduce a greater amount of power consumption while suppressing effects on throughput.

Preferably, when the reference time has elapsed from the switching to the power-save mode without receiving the next command, the serial interface is switched to a second power-save mode which requires longer reset time than that of the power-save mode. Such arrangement enables further reduction in consumption power.

According to the present invention, it is possible to improve power management of a serial interface of a data storage device.

DETAILED DESCRIPTION OF THE INVENTION

Figure 1:
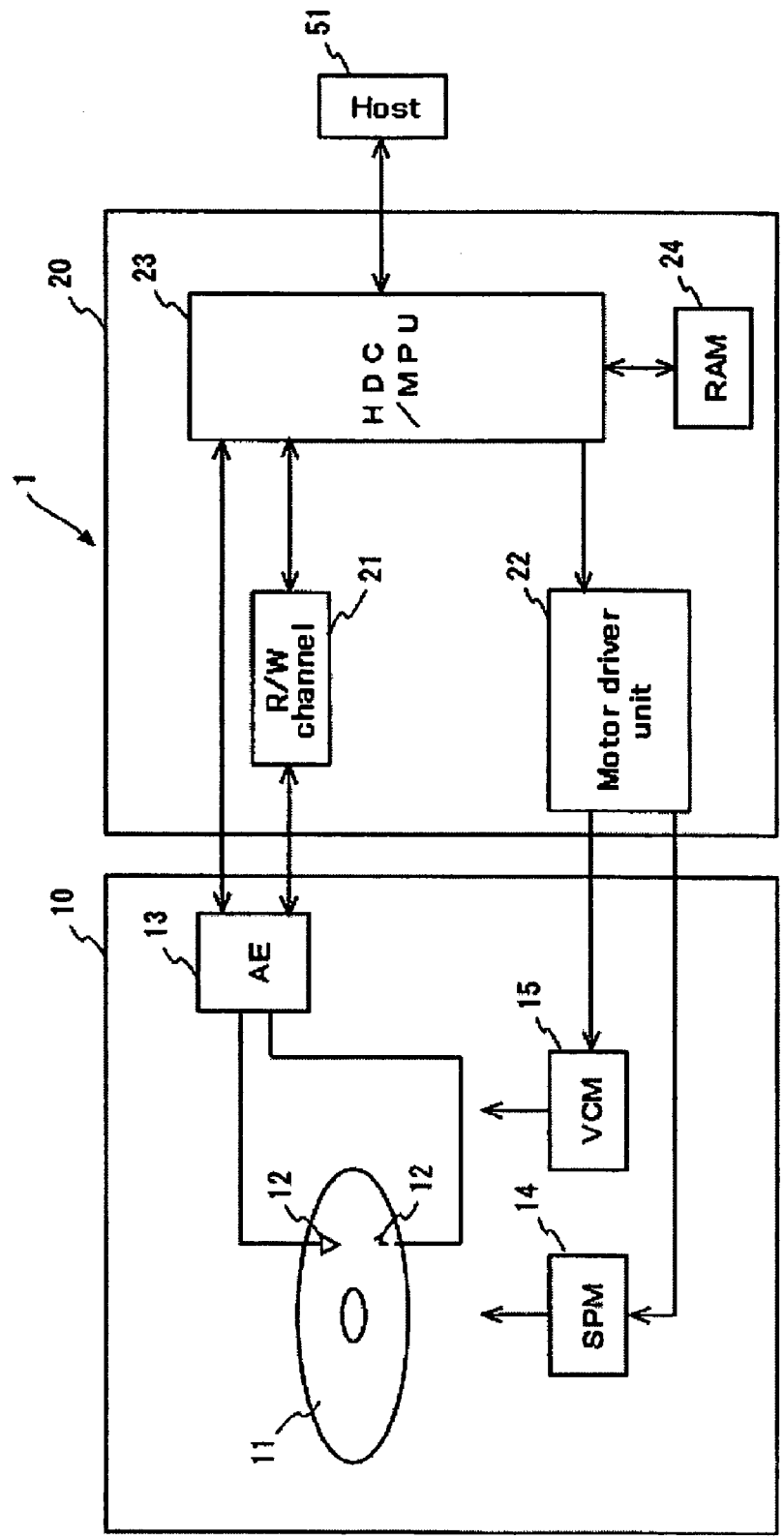
FIG. 1 is a block diagram showing a schematic configuration of an HDD according to an exemplary embodiment.

Hereinafter, an exemplary embodiment to which the present invention is applicable will be described. To clearly articulate the explanation, descriptions and drawings stated hereunder are partially omitted and simplified as appropriate. It should be noted that, in each drawing, the same reference numerals are given to the same components, and redundant descriptions thereof are omitted as required to clearly articulate the explanation.

Hereinafter, specific embodiments to which the present invention is applied will be described in detail with reference to accompanying drawings. To make the present invention more understandable, outline of the overall configuration of a hard disk drive (HDD), which is an example of a data storage device, will be described first. FIG. 1 is a block diagram showing a schematic configuration of an HDD 1 according to the embodiment. As shown in FIG. 1, the HDD 1 includes a magnetic disk 11 which is an example of recording media, a head element 12 which is an example of heads, an arm electronics (AE) 13, a spindle motor (SPM) 14 and a voice coil motor (VCM) 15 within a hermetically-sealed enclosure 10.

Further, an HDD 100 is provided with a circuit substrate 20 which is fixed on the outer side of the enclosure 10. On the circuit substrate 20 are provided a read/write channel (R/W channel) 21, a motor driver unit 22, a hard disk controller (HDC)/MPU integrated circuit (hereinafter referred to as HDC/MPU) 23, and ICs including a RAM 24 as an example of memory. It should be noted that the circuit configurations above can be integrated into one IC or can be divided into a plurality of ICs for mounting.

Write data from an external host 51 is received by the HDC/MPU 23 and is written on the magnetic disk 11 by the head element 12 via the R/W channel 21 and the AE 13. Further, data stored on the magnetic disk 11 is read by the head element 12, and the data thus read is output to the external host 51 from the HDC/MPU 23 via the AE 13 and the R/W channel 21.

Figure 2:
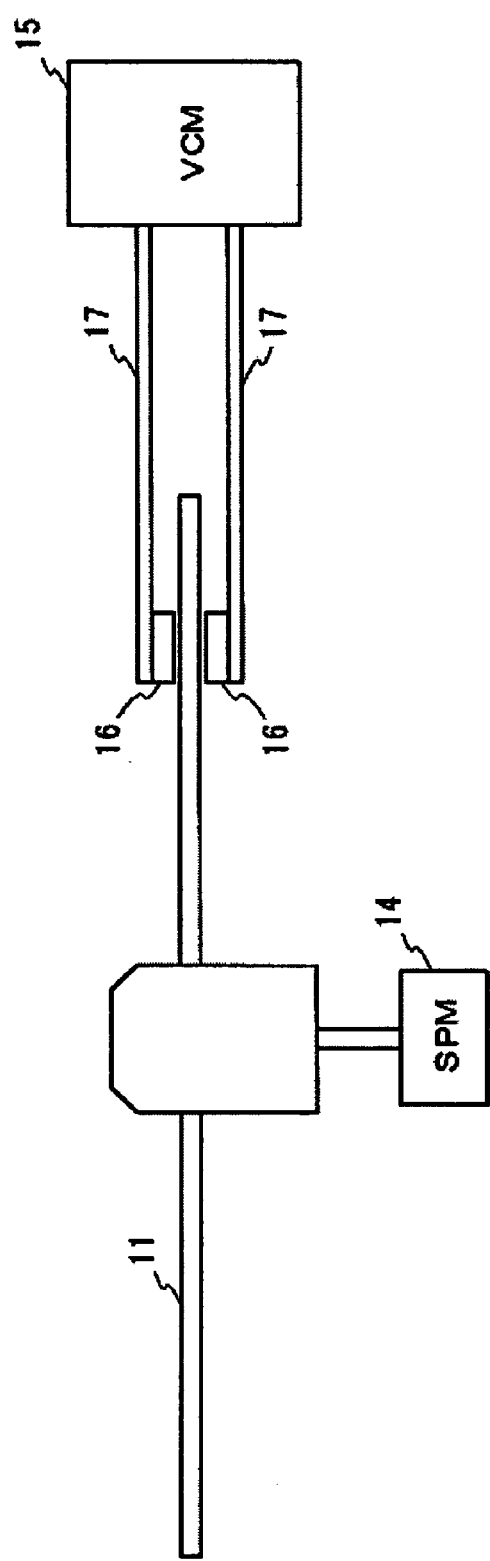
FIG. 2 is a block diagram showing a schematic configuration of an HDD according to the embodiment.

Next, each component of the HDD 100 will be described. First, referring to FIG. 2, the outline of a drive mechanism of the magnetic disk 11 and the head element 12 will be described. The magnetic disk 11 is fixed on the hub of the SPM 14. The SPM 14 rotates the magnetic disk 11 at a specified speed. The motor driver unit 22 drives the SPM 14 according to control data from the HDC/MPU 23. The magnetic disk 11 of the embodiment is provided with recording surfaces on which data is recorded on both sides thereof and the head elements 12 (not shown in FIG. 2) are provided which associate with respective recording surfaces.

The head elements 12 are fixed on respective sliders 16. Further, the slider 16 is fixed on a carriage 17. The carriage 17 is fixed on the VCM 15, and the VCM 15, as being pivoted, moves the slider 16 and the head element 12. The motor driver unit 22 drives the VCM 15 according to control data from the HDC/MPU 23.

To enable reading/writing of data from/to the magnetic disk 11, the carriage 17 moves the slider 16 and the head element 12 over to the data area on a surface of the rotating magnetic disk 11. As the carriage 17 pivots, the slider 16 and the head element 12 move along with the radial direction on the surface of the magnetic disk 11, whereby the head element 12 is enabled to access the desired area.

As a pressure caused by viscosity of air existing between the air bearing surface (ABS) of the slider 16, which faces the magnetic disk 11, and the rotating magnetic disk 11 is equal to a force applied toward the magnetic disk 11 by the carriage 17, the slider 16 and the head element fixed thereto fly at a given distance from the magnetic disk 11. Typically, a write head which converts electric signals to magnetic fields according to data to be stored on the magnetic disk 11 and a read head which converts magnetic fields from the magnetic disk 11 to electric signals are formed on the head element 12 as an integral part. It should be noted that at least one magnetic disk 11 may suffice, and the recording surface can be formed on a single side or double sides of the magnetic disk 11.

Next, referring to FIG. 1 again, each circuit will be described. The AE 13 selects one head element 12, among a plurality of head elements 12, through which data access is executed, amplifies a read signal to be read by the head element 12 thus selected at a constant gain (pre-amplifying) and sends the signal to the R/W channel 21. Further, the AE 13 sends a write signal from the R/W channel 21 to the selected head element 12.

The R/W channel 21 executes a write process on the data transferred from the host 51. In the write process, the R/W channel 21 executes a code modulation on the write data supplied by the HDC/MPU 23 and further converts the code-modulated write data into a write signal (current), thereby supplying the signal to the AE 13. Further, when supplying data to the host 51, the R/W channel 21 executes a read process. In the read process, the R/W channel 21 amplifies the read signal supplied from the AE 13 so that the signal amplitude can be constant, extracts data out of the read signal thus acquired, and executes a decoding process. The data to be read includes user data and servo data. The decode-processed read data is supplied to the HDC/MPU 23.

The HDC/MPU 23 is a circuit in which an MPU 230 and an HDC are integrated into one chip. The MPU 230 operates according to micro-codes loaded in the RAM 24, in which, as the HDD 1 starts up, data that is required for control and data processing, in addition to micro-codes that run on the MPU 230, are loaded from the magnetic disk 11 or a ROM (not shown in FIG. 1). The HDC/MPU 23 executes overall control of the HDD 1 in addition to processes that are required for data processing such as positioning control of the head element 12, interface control and defect control. In particular, the HDC/MPU 23 executes control of the power-save modes to reduce consumption as well as switching among the power-save-modes and the active mode. Further description will be made on this point in detail later.

The HDC/MPU 23 is provided with an interface function with the host 51 and receives user data and commands such as a read command and a write command that are transmitted from the host 51. The user data received is transferred to the R/W channel 21. Further, the HDC/MPU 23 transmits read data that is acquired from the R/W channel and read from the magnetic disk 11 to the host 51. Further, the HDC/MPU 23 executes a process for error correction (ECC) on user data that is acquired from the host 51 or is read from the magnetic disk 11. The HDD 1 according to the embodiment executes sending and receiving of data (including commands, user data and control data) through serial communication. Toward this end, a sequence which is characteristic in terms of controlling the power-save modes is executed. Further description will be made on this point in detail later.

Data to be read by the R/W channel 21 includes servo data in addition to user data. The HDC/MPU 23 executes positioning control of the head element 12 by using the servo data. Control data from the HDC/MPU 23 is output to the motor driver unit 22. The motor driver unit 22 supplies driving current to the VCM 15 according to the control signal. The HDC/MPU 23 controls read/write processes of data by using the servo data. Further, the HDC/MPU 23 executes control of read/write processes of data by using the servo data.

Next, power-save mode control of the HDD 1 according to the embodiment and the data communication with the host 51 associated therewith will be described. The HDD 1 according to the embodiment executes sending and receiving of data such as commands, user data and control data in communication protocols through serial data communication. In addition, the HDD 1 according to the embodiment is capable of controlling the power save-modes of the serial interface independently from other circuits and preferentially switching the serial interface to a power-save mode.

The HDD 1 according to the embodiment is further provided with two different power-save modes which suspend circuits of the serial interface. The power-save modes of the serial interface include a partial suspend mode which suspends part of the circuits and a suspend mode which suspends other circuits in addition to the circuits that are suspended by the partial suspend mode. With the partial suspend mode according to the embodiment, part of the circuits of the serial interface is still in the active status. It is understood in general that the suspend mode enables reduction in greater amount of consumption power than the partial suspend mode and a longer period of time is required before being reset. It should be noted that, it is possible that the circuit which has been suspended in the partial suspend mode is reset to the active, then other circuits in addition to the circuits that are suspended by the partial suspend mode are switched to the suspend mode.

The power-save mode control of the serial interface according to the embodiment is suitable particularly for the Serial ATA (SATA) Specification which stipulates a method of transferring data between a data storage device and a host. When description is made by taking the SATA as an example, the partial mode is an example of partial suspend modes and the slumber mode is an example of suspend mode of the serial interface. It should be noted that the SATA only stipulates times required before those power-save modes reset, and it does not stipulate configurations of the circuit to be suspended. It should be also noted that, hereafter, the embodiment will be described by referring to the SATA as required. However, the scope of the present invention will not be limited to the SATA.

Figure 3:
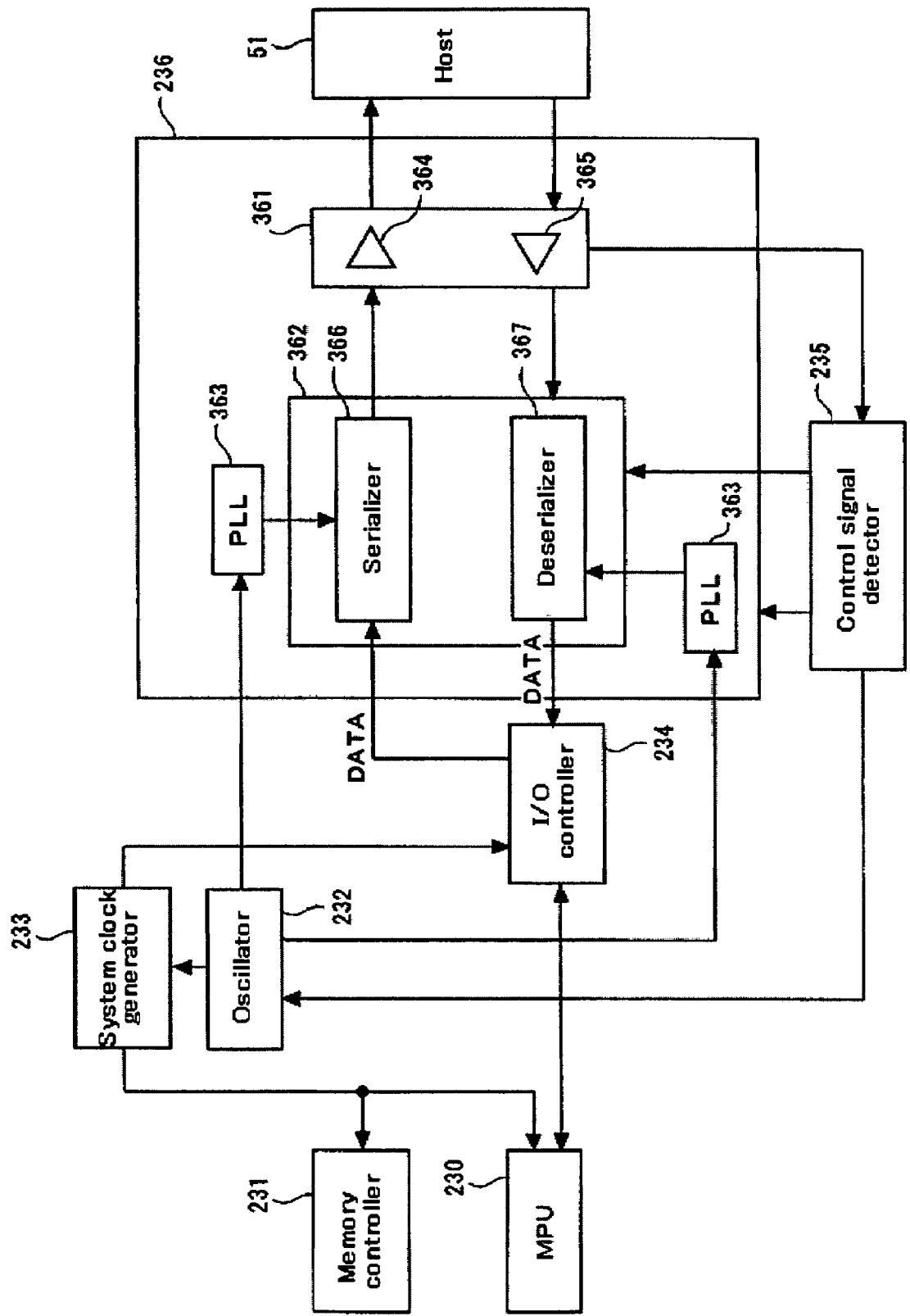
FIG. 3 is a block diagram showing a schematic configuration of part of a circuit of an HDC/MPU according to the embodiment.

FIG. 3 is a schematic block diagram showing a configuration of part of the circuit in the HDC/MPU 23 of the embodiment. The HDC/MPU 23 includes an MPU 230, a memory controller 231 which controls data transfer with a memory (RAM 24), an oscillator 232, a system clock generator 233 which generates the system clock based on signals from the oscillator, an I/O controller 234 which controls communication with the host 51, a control signal detector 235 which detects a control signal that is not based on the clock from the host 51 (the control signal being referred herein to as the out-of-band control signal), and a serial interface 236 which interfaces serial data communication with the host 51.

The serial interface 236 includes an analog front-end 361, a serializer/deserializer 362 and a PLL 363. The analog front-end 361 incorporates a transmitter 364 and a receiver 365. The serializer/deserializer 362 includes a serializer 366 which converts parallel data into serial data and output the converted data to the analog front-end 361 and a deserializer 367 which converts serial data from the analog front-end 361 into parallel data.

The PLL 363 generates a clock signal for serial data communication from the signal from the oscillator 232 and supplies the signal to each of the serializer 366 and deserializer 367. The deserializer 367 executes a serial-parallel conversion in accordance with an internal clock signal which is synchronized with a clock signal that is embedded in the serial data received.

In the partial suspend mode of the serial interface 236, the serializer/deserializer 362 is suspended, whereas the PLL 363 and the analog front-end 361 are in the operating status. In the suspend mode, the PLL 363 is suspended in addition to the serializer/deserializer 362. The analog front-end 361 is in the operating status. Comparing to the partial suspend mode, it is understood in general that the suspend mode consumes less power, but much more time is required before being reset to the active mode.

As stated above, the serial interface 236 is provided with two power-save modes, but, once the serial interface 236 has been switched to a power-save mode, it becomes not possible to send and receive data through serial data communication complying with the clock. For this reason, when the serial interface 236 is in a power-save mode, the host 51 requests the HDD 1 for resetting from the power-save mode by transmitting an out-of-band control signal that is not based on the clock. The out-of-band signal may be configured with a plurality of burst signals which are provided with given intervals.

The control signal detector 235 detects an out-of-band control signal from the host 51 and, in responding to the detection, executes a process to reset the internal circuit. In the embodiment, when the serial interface 236 of the HDD 1 is in a power-save mode, the serial interface of the host 51 is also switched to the power-save mode. For this reason, also when the HDD 1 makes a request to the host 51, the out-of-band control signal is used. When description is made by taking the SATA as an example, the COMWAKE is an example of the out-of-band control signal for requesting reset from the power-save mode.

Hereinafter, power management of the serial interface 236 of the HDD 1 according to the embodiment will be described. As stated above, the HDD 1 is capable of preferentially switching the serial interface 236 to the power save mode among other circuits. The HDD 1 according to the embodiment receives a command from the host 51 and sets the serial interface 236 in the power-save mode, or more preferably to the partial suspend mode in the command execution sequence for at least a partial period of time during which no sending and receiving through the serial data communication with the host 51 exists.

The power-save modes of the serial interface 236 do not require much time before they are reset, and therefore, it is possible to switch the serial interface to a power-save mode during the command execution sequence. This enables reduction in consumption power of the HDD 1. Timing for switching to the power-save mode and timing for switching (resetting) to the active mode from the power-save mode are varied according to content of the command received.

For example, the timing for switching to the power-save mode and the timing for resetting to the active mode in the content (type) of a command and the command execution sequence are stored in advance in a ROM or the magnetic disk 11. The MPU 230 identifies the command received in accordance with the pre-registered data and controls switching to a power-save mode of the serial interface 236 for each command.

Hereinafter, a specific description will be made of a non-data command which does not accompany sending and receiving of user data, a data-in command (read command) which reads data from the HDD 1 and a data-out command (write command) which writes data on the HDD 1. It should be noted that, although no description is hereinafter made in detail, the serial interface 236 is switched to the suspend mode, and not to the partial suspend mode, for commands such as a switching command to the sleep mode that require a reasonable period of time for reset, or more specifically those commands that require longer time than that required for resetting from the suspend mode.

Further, the HDD 1 according to the embodiment switches the serial interface 236 to a power-save mode in responding to completion of command execution. Since, basically, no sending and receiving of serial data exists right after the command is completed, the serial interface 236 is switched to the power-save mode with this timing, thus reducing consumption power.

In addition, when the serial interface 236 is switched to the partial suspend mode, and then the reference time has elapsed without receiving the subsequent command, the serial interface 236 is switched to the suspend mode. With such arrangement, it is possible to more effectively reduce consumption power and minimize delay (an effect on throughput) in initiating command execution. The reference time can be a pre-registered given period of time or can be varied according to content (type) of a command or the past history of received commands.

First, a basic sequence of power management of a serial interface after the completion of a command execution will be described with reference to the flow chart in FIG. 4. It should be noted that detailed processes in the sequence will be described later. To clearly articulate the explanation, the description will be made in such a manner that each process is sequentially executed according to the flow chart. However, the processes may be put out of sequence, or a plurality of processes may be executed concurrently, which can be similarly applied to other power management sequences.

Figure 4:
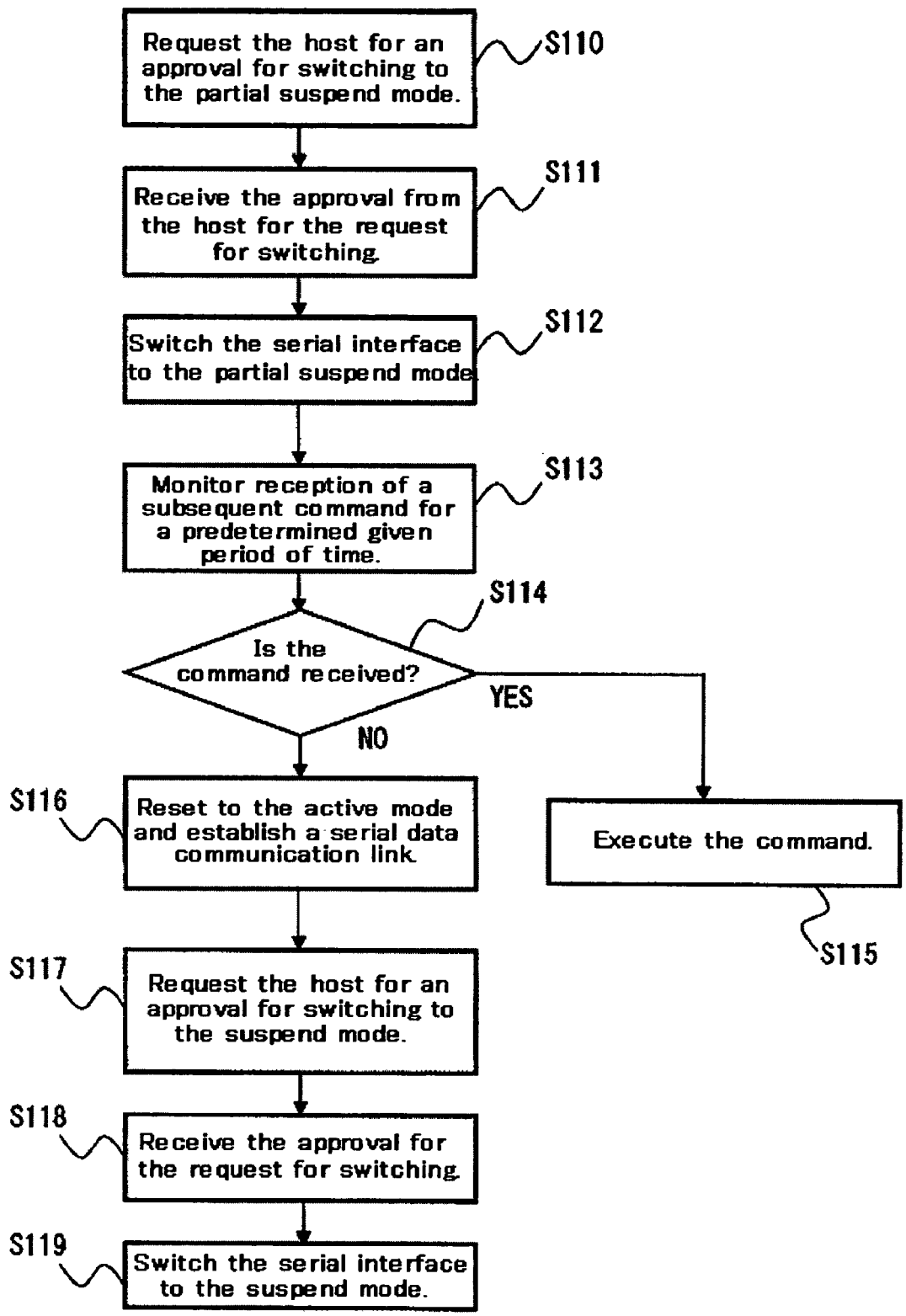
FIG. 4 is a flow chart showing a power management sequence of a serial interface after completion of the command execution according to the embodiment.

Referring to FIG. 4, when command execution is completed, the HDD 1 requests a host 51 to switch the serial interface 236 to the partial suspend mode (S110). Upon receiving an approval for the request from the host 51 (S111), the HDD 1 switches the serial interface 236 to the partial suspend mode (S112). The HDD 1 monitors receipt of a subsequent command for a predetermined given period of time (S113) and judges whether or not the subsequent command is received (S114). If the subsequent command is received, the HDD 1 executes the command (S115).

If the subsequent command is not received, the HDD 1 resets the serial interface 236 to the active mode and establishes a serial data communication link with the host 51 (S116). The HDD 1 requests the host 51 for an approval for switching the serial interface 236 to the suspend mode (S117). Upon receiving an approval for the request (S118), the HDD 1 switches the serial interface 236 to the suspend mode (S119). It should be noted that, in the embodiment, receipt of a subsequent command is monitored while setting a predetermined given period of time to be the reference time. However, as stated above, it is also possible to use a reference time that varies according to the history of commands received.

Non-Data Command

Figure 5:
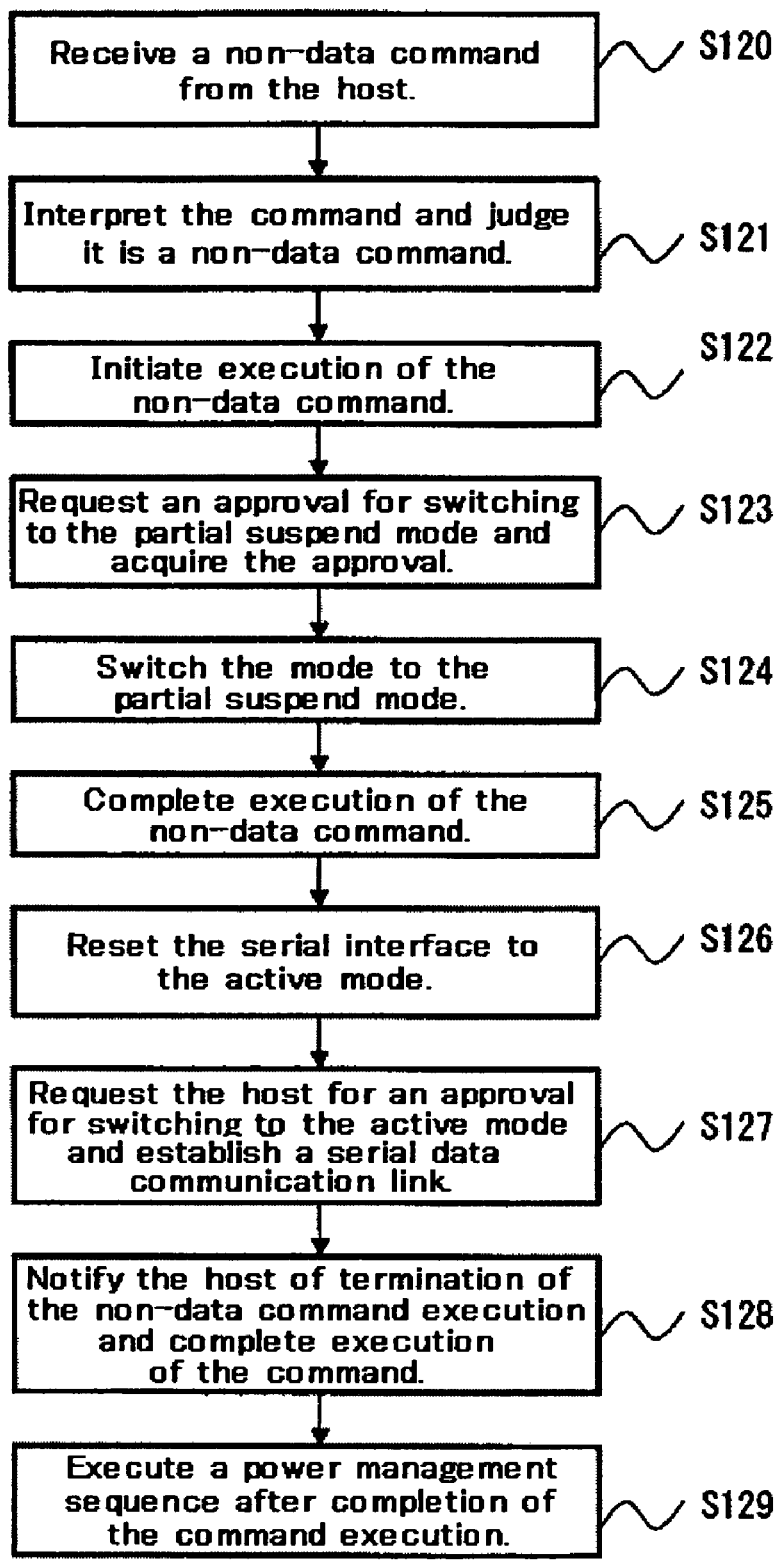
FIG. 5 is a flow chart showing a power management sequence of a serial interface in a sequence to execute a non-data command according to the embodiment.

Referring to FIG. 5, an outline of a power management sequence of the serial interface 236 will be described for a case where a non-data command for which sending and receiving of user data such as Seek, Recal and Verify are not executed between the host 51 and the HDD 1 is transmitted to the HDD 1 from the host 51. The details will be described following the outlined description. Here, the Seek is a command which moves the head element 12 to a track on which an LBA sector designated by the command exists. The Recal is a command which moves the head element 12 to a track 0. The Verify is a command (not accompanying data transfer) which moves the head element 12 to an LBA sector designated by the command, reads the number of designated blocks from a medium and checks if there is no error.

First, the HDD 1 receives a non-data command from the host 51 (S120). The HDD 1 interprets the received command, and, if it is judged that the command is a non-data command (S121), then execution of the non-data command is initiated (S122). The HDD 1 requests the host 51 for an approval for switching the serial interface 236 to the partial suspend mode and acquires the approval from the host 51 (S123). In responding to the acquisition of the approval, the HDD 1 sets the serial interface 236 to the partial suspend mode (S124). Further, the serial interface is switched to a power-save mode in the host 51 as well.

Upon completion of the non-data command execution (S125), the HDD 1 resets the serial interface 236 which is set from a power-save mode to the active mode (S126). Further, the HDD 1 transmits an out-of-band control signal to the host 51 to make a request to switch to the active mode and establishes a serial data communication link with the host 51 (S127). Then, the HDD 1 notifies the host 51 of termination of the non-data command execution, which completes the command execution (S128). Upon completion of the command execution, the HDD 1 executes the above-stated power management sequence that is executed after completion of the command execution.

Hereinafter, a power management sequence for a case where the HDD 1 receives a non-data command will be specifically described in detail. The flow chart in FIG. 5 will be referred to from time to time. When the analog front-end 361 receives a non-data command from the host 51 (S120), the command is first serial-parallel converted by the deserializer 367 and is transferred to the I/O controller 234. When the I/O controller 234 notifies the MPU 230 of the command reception, the MPU 230, in responding to the notification of the command reception, interprets the command and judges the command is a non-data command (S121).

The MPU 230, upon judging the command is a non-data command, generates a request for an approval for switching to the partial suspend mode and outputs the request to the I/O controller 234. The request transferred from the I/O controller 234 is first parallel-serial converted by the serializer 366 and then transferred to the host 51 via the analog front-end 361 (S123).

Upon generating the request for an approval for switching the mode, the MPU 230 initiates execution of the non-data command (S122). Upon receiving the approval for the quest from the host 51 (S123), the I/O controller 234 switches the serial interface 236 to the partial suspend mode (S124). The I/O controller 234, upon completion of switching to the partial suspend mode, notifies the MPU 230 of completion of switching.

When the MPU 230 completes execution of the non-data command (S125), the MPU 230 generates a request to switch the serial interface 236 to the active mode, and the request is transferred to the I/O controller 234. The I/O controller 234 switches (resets) the serial interface 236 to the active mode (S126).

The I/O controller 234 requests the host 51 for switching the mode by outputting an out-of-band control signal to the host 51 via the analog front-end 361. When the serial interface of the host 51 is switched to the active mode, the I/O controller 234 establishes a serial data communication link with the host 51 (S127) and notifies the MPU 230 of completion of switching to the active mode. In responding to the notification, the MPU 230 generates a completion notification of the non-data command execution and sends the notification to the host 51 via the I/O controller 234, the serializer 366 and the analog front-end 361 (S128).

Hereinafter, a sequence of power management that is executed after the non-data command execution (S129) will be described in detail. The flow chart shown in FIG. 4 will be referred to from time to time. As stated above, when execution of the non-data command is completed, a request for an approval for switching to the partial suspend mode is generated. The approval request is then transferred to the I/O controller 234, whereby being transmitted to the host 51 via the front-end following a parallel-serial conversion by the serializer 366 (S110). When the host 51 acknowledges an approval for the request to the HDD 1 (S111), the I/O controller 234 switches the serial interface to the partial suspend mode (S112). Upon completion of the switching, a completion notification of switching to the partial suspend mode is sent to the MPU 230 from the I/O controller 234.

The MPU 230 monitors reception of a subsequent command (S113) and judges whether the subsequent command is received or not in a predetermined given period of time (S114). If the subsequent command is received, the HDD 1 executes the command (S115). When the MPU 230 judged that the subsequent command was not received in a predetermined given period of time, the MPU 230 generates a request for switching the serial interface to the active mode. The I/O controller 234 to which the request for switching the active mode was transferred sets the serial interface to the active mode (S116). The I/O controller 234 requests the host 51 for switching to the active mode by means of an out-of-band control signal via the analog front-end 361.

The I/O controller 234, upon receiving an approval for switching to the active mode (or a notification that switching has been made to the active mode) from the host 51, establishes a serial data communication link with the host 51 (S116) and notifies the MPU 230 of completion of switching to the active mode.

The MPU 230 which acquired the completion notification of switching to the active mode generates a request for an approval for switching to a suspend mode. The request is transferred to the I/O controller 234 and is then transmitted to the host 51 via the serializer 366 and the analog front-end 361 (S117). When the host 51 executes a respond to approve the switching to the suspend mode (S118), the I/O controller 234 switches the serial interface to the suspend mode (S119). Upon completion of the switching, the I/O controller 234 notifies the MPU 230 of completion of switching to the suspend mode.

Data-in Command

Referring to a flow chart in FIG. 6, an outline of a power management sequence of the serial interface 236 will be described for a case where a data-in command is transmitted to the HDD 1 from the host 51. The data-in command is a command to read data (read command) such as Read, Read Multiple and Read DMA from the HDD 1. In an execution sequence of the read command, upon receipt of a read command, the serial interface 236 is set to a power-save mode for at least a partial period of time until the head element 12 arrives at the target address. Since no sending and receiving of data through serial data communication with the host 51 exists during this period, it is possible to effectively reduce consumption power.

To reduce consumption power, preferably the serial interface 236 is reset to the active mode after the head element 12 arrives at the track of the target address (with timing later than the timing of such arrival). Alternatively, the serial interface 236 is reset to the active mode at timing right before transmitting data read from the magnetic disk 11 to the host 51, whereby it is possible to further reduce consumption power. It should be noted that, for the case of a cache hit, since it is possible to immediately transmit read data to the host 51, the active mode can be retained without allowing the serial interface 236 to be switched to the power-save mode.

Figure 6:
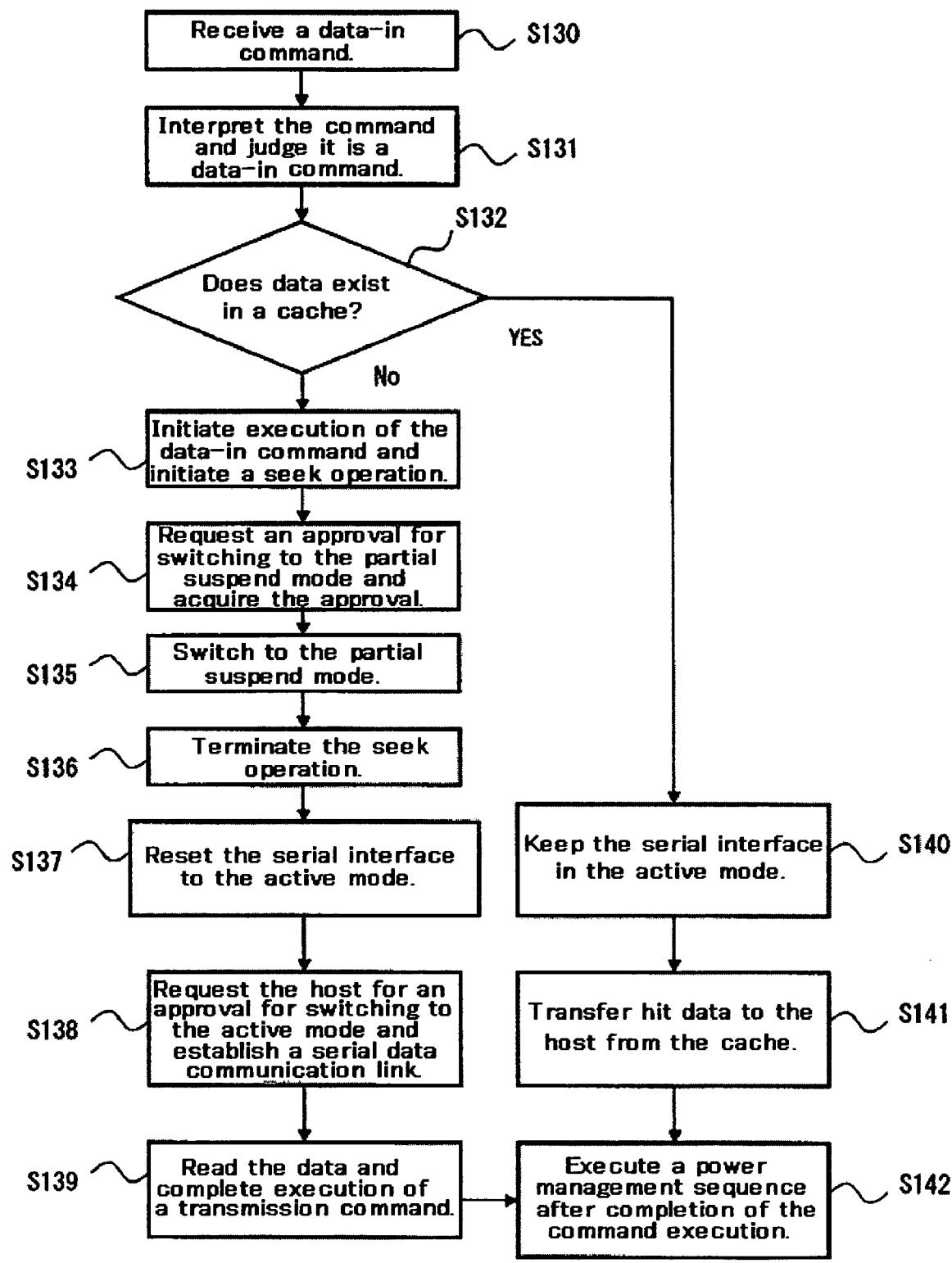
FIG. 6 is a flow chart showing a power management sequence of a serial interface in a sequence to execute a data-in command according to the embodiment.

Referring to FIG. 6, first, upon receiving a data-in command from the host 51 (S130), the HDD 1 interprets the command and judges that the command is a data-in command (S131). The HDD 1 executes a cache search and judges whether data to be transferred exists on a cache (S132). If the data to be transferred does not exist on a cache, the HDD 1 initiates execution of the data-in command. Specifically, a seek operation is initiated (S133).

The HDD 1 requests the host 51 to approve switching of the serial interface 236 to the partial suspend mode and acquires the approval from the host 51 (S134). Thereafter, the HDD 1 switches the serial interface 236 to the partial suspend mode (S135). With the embodiment, upon completion of the seek operation (which implies arrival of the head element to the target track, here) (S136), the HDD 1 resets the serial interface 236 that has been set to the partial suspend mode back to the active mode (S137). The HDD 1 transmits an out-of-band signal to the host 51 for requesting switching to the active mode and establishes a serial data communication link with the host 51 (S138).

When the head element 12 arrives at the target sector on the magnetic disk 11, the HDD 1 initiates data reading from the magnetic disk 11 and transmits the data thus read to the host 51, which completes execution of the command (S139). It should be noted that, with the embodiment, the serial interface 236 is switched to the active mode after the seek completion. However, as is the case stated above, switching may be made right before the data is transmitted to the host 51.

In the step S132, if the data to be transferred exists on a cache, the serial interface 236 is retained in the active mode without being switched to a power-save mode (S140). Hit data is then transmitted to the host 51 from the cache, which completes execution of the command (S141). Upon completion of the command execution, the above-stated power management sequence after completion of the command execution is executed for both the cases where data exists on a cache and data does not exist on a cache (S142).

Hereinafter, a power management sequence for a case where the HDD 1 receives a data-in command will be specifically described in detail. The flow chart in FIG. 6 will be referred to from time to time. Here, descriptions will separately be made of a case where read data to be transferred does not exist on a cache (Cache No Hit) and a case where read data exists on a cache (Cache Hit). First, each process for a sequence when read data to be transferred does not exist on a cache will be described.

When the analog front-end 361 receives a data-in command from the host 51 (S130), the command is first serial-parallel converted by the deserializer 367 and is then transferred to the I/O controller 234. When the I/O controller 234 notifies the MPU 230 of the command reception, the MPU 230, in responding to the notification of the command reception, interprets the command and judges the command is a non-data command (S131).

The MPU 230 executes a cache search. No read data exists on a cache, and the MPU 230 makes a judgment of Cache No Hit (S132). The MPU 230 generates a request for approval for switching to the partial suspend mode and outputs the request to the I/O controller 234. The request for switching approval transferred from the I/O controller 234 is parallel-serial converted by the serializer 366 and is then transferred to the host 51 via the analog front-end 361 (S134). Further, the MPU 230 initiates execution of the data-in command. Specifically, a seek operation is initiated first (S133).

When the host 51 acknowledges an approval for the request for switching to the partial suspend mode (S134), the I/O controller 234 switches the serial interface to the partial suspend mode (S135). Upon completion of the switching, a completion notification of switching to the partial suspend mode is sent to the MPU 230 from the I/O controller 234.

Thereafter, upon completion of the seek operation (S136), the MPU 230 generates a request for an approval for switching the serial interface to the active mode, and the request is transferred to the I/O controller 234. The I/O controller 234 switches the serial interface to the active mode (S137). The I/O controller 234 outputs an out-of-band control signal to the host 51 via the analog front-end 361 and requests for switching (S138). When the serial interface of the host 51 is switched to the active mode, the I/O controller 234 establishes a serial data communication link with the host 51 (S138) and notifies the MPU 230 of completion of switching to the active mode.

When the head element 12 arrives at the target sector, the MPU 230 initiates reading of read data from the magnetic disk 11 via the R/W channel 21, and the read data is transferred to the serializer 366 via the I/O controller 234 for conversion into serial data. Thereafter, the serial data is output to the host 51 by the analog front-end 361 (S139). Upon completion of data transfer to the host 51, the MPU 230 outputs the status to the host 51, which completes execution of the data-in command. The power management sequence that is executed after the data-in command execution is already described as the above (S142).

Hereinafter, the case where data to be transferred exists on a cache (Cache Hit) will be described. It should be noted that, in the embodiment, the case of All Hit is handled as Cache Hit and Half Hit is handled as Cache No Hit. When the analog front-end 361 receives a data-in command from the host 51 (S130), the command is serial-parallel converted by the deserializer 367 and is then transferred to the I/O controller 234. When the I/O controller 234 notifies the MPU 230 of the command reception, the MPU 230, in responding to the command reception notification, interprets the command and judges that the command is a data-in command (S131).

The MPU 230 executes a cache search and the result is the All Hit. The serial interface 236 is retained in the active mode (S140). The I/O controller 234 transfers data stored in the cache to the serializer 366. The data is parallel-serial converted and the converted data is transferred to the host 51 via the analog front-end 361 (S141). The MPU 230 outputs the status to the host 51, completing execution of the data-in command (S141). The power management sequence that is executed after the data-in command execution is already described as the above (S142).

Data-out Command

Figure 8:
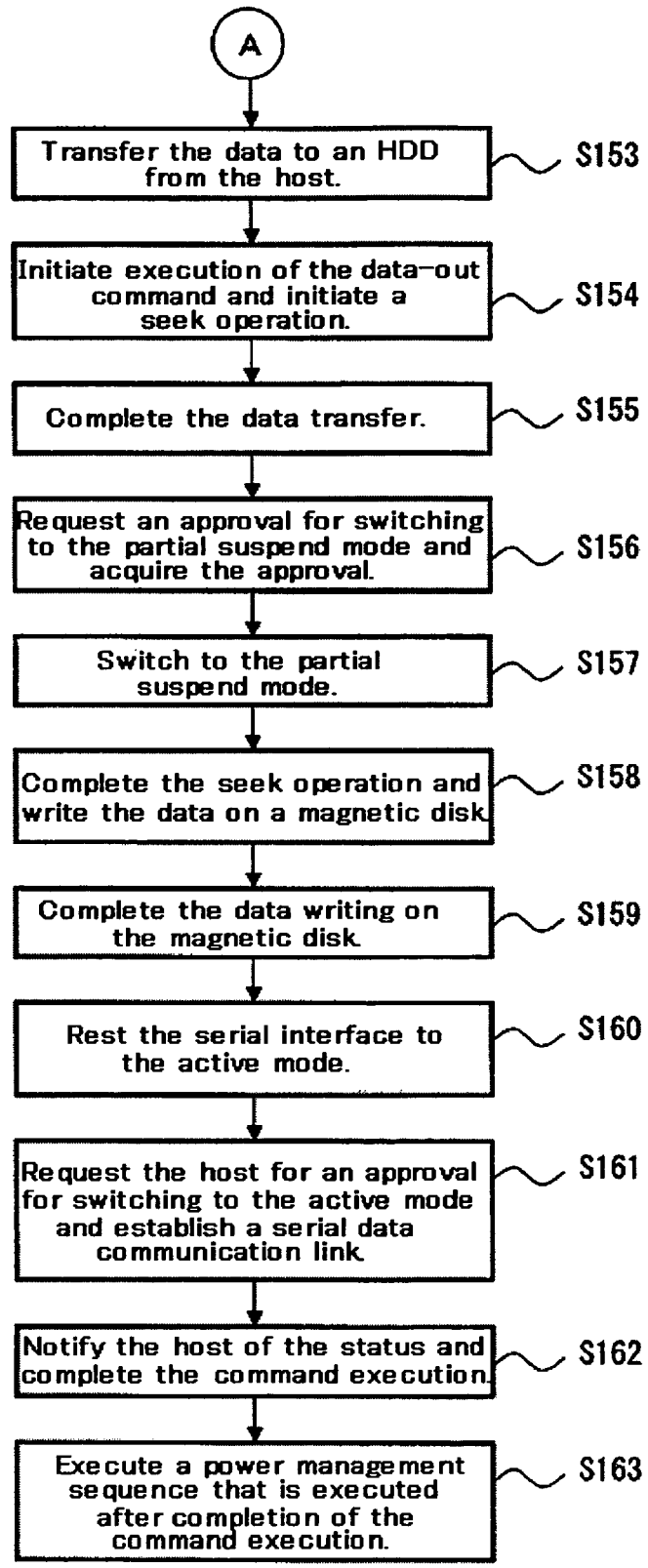
FIG. 8 is a flow chart showing a power management sequence of a serial interface for a case where a write cache is off in a sequence to execute a data-out command according to the embodiment.
Figure 9:
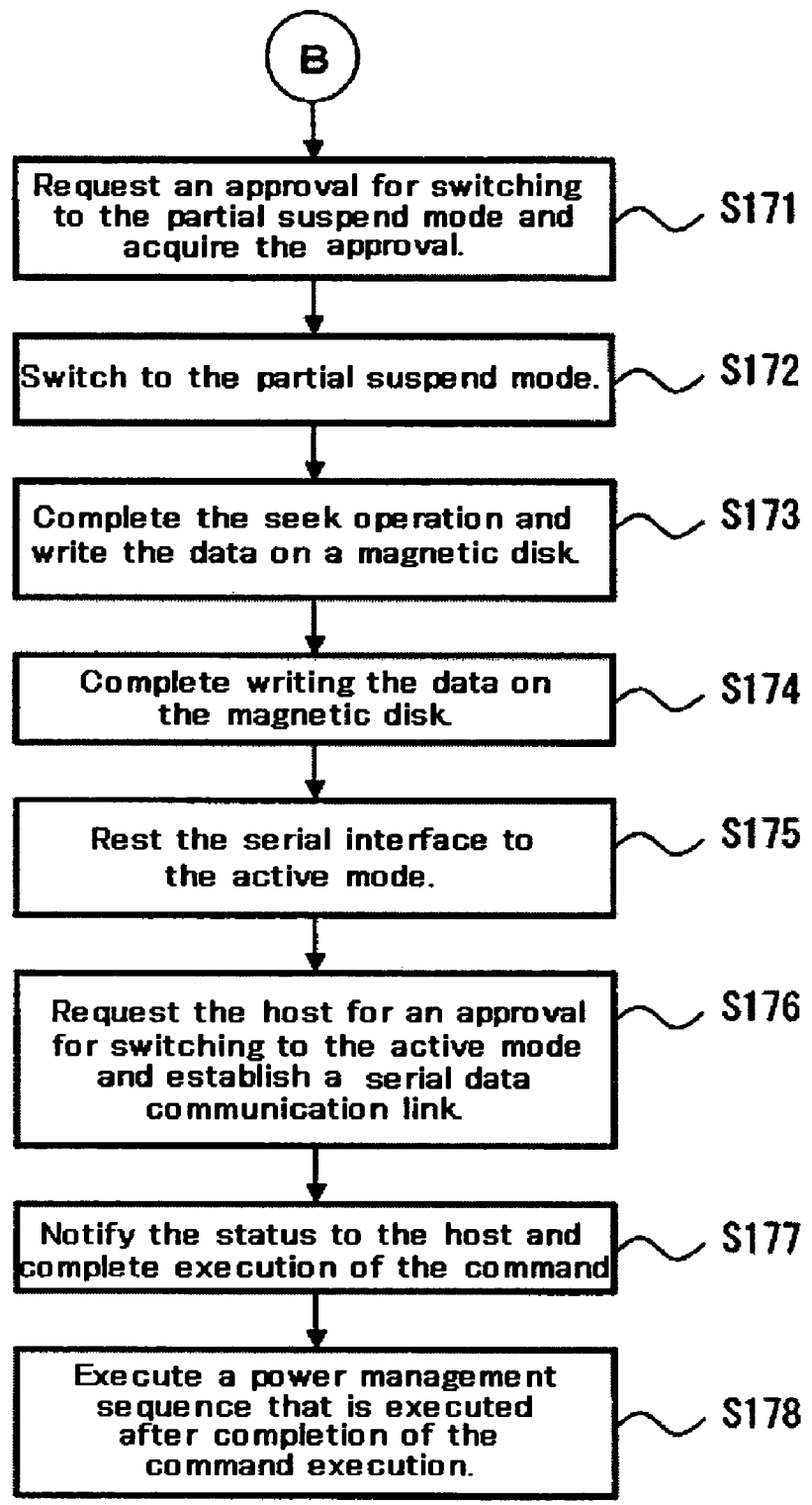
FIG. 9 is a flow chart showing a power management sequence of a serial interface for a case where a write cache is on and no free space exists in a buffer and a cache in a sequence to execute a data-out command according to the embodiment.

Referring to flow charts in FIGS. 7, 8 and 9, an outline of a power management sequence of the serial interface 236 will be described for a case where a data-out command is transmitted to the HDD 1 from the host 51. The data-out command is a command to write data (write command) such as Write, Write Multiple and Write DMA to the HDD 1. In an execution sequence of the write command (data-out command), the serial interface 236 is set to a power-save mode at least for a partial period of time from the transfer completion of write data to write completion of the write data on the magnetic disk 11. This enables reduction in consumption power.

It is preferable that, after completion of writing data on the magnetic disk 11, the serial interface 236 be reset to the active mode from a power-save mode. Alternatively, it is also possible to reset the mode before or during data writing on the magnetic disk 11, after completion of a seek operation. It should be noted that the switching to the power-save mode will not be executed to avoid effects on throughput, when the write cache is ON and a buffer has a free space sufficient to initiate transfer of subsequent data, or when a queue that is allocated to the write cache has a free space. It should be also noted that the buffer and the queue can be secured in the RAM 24, for example.

Figure 7:
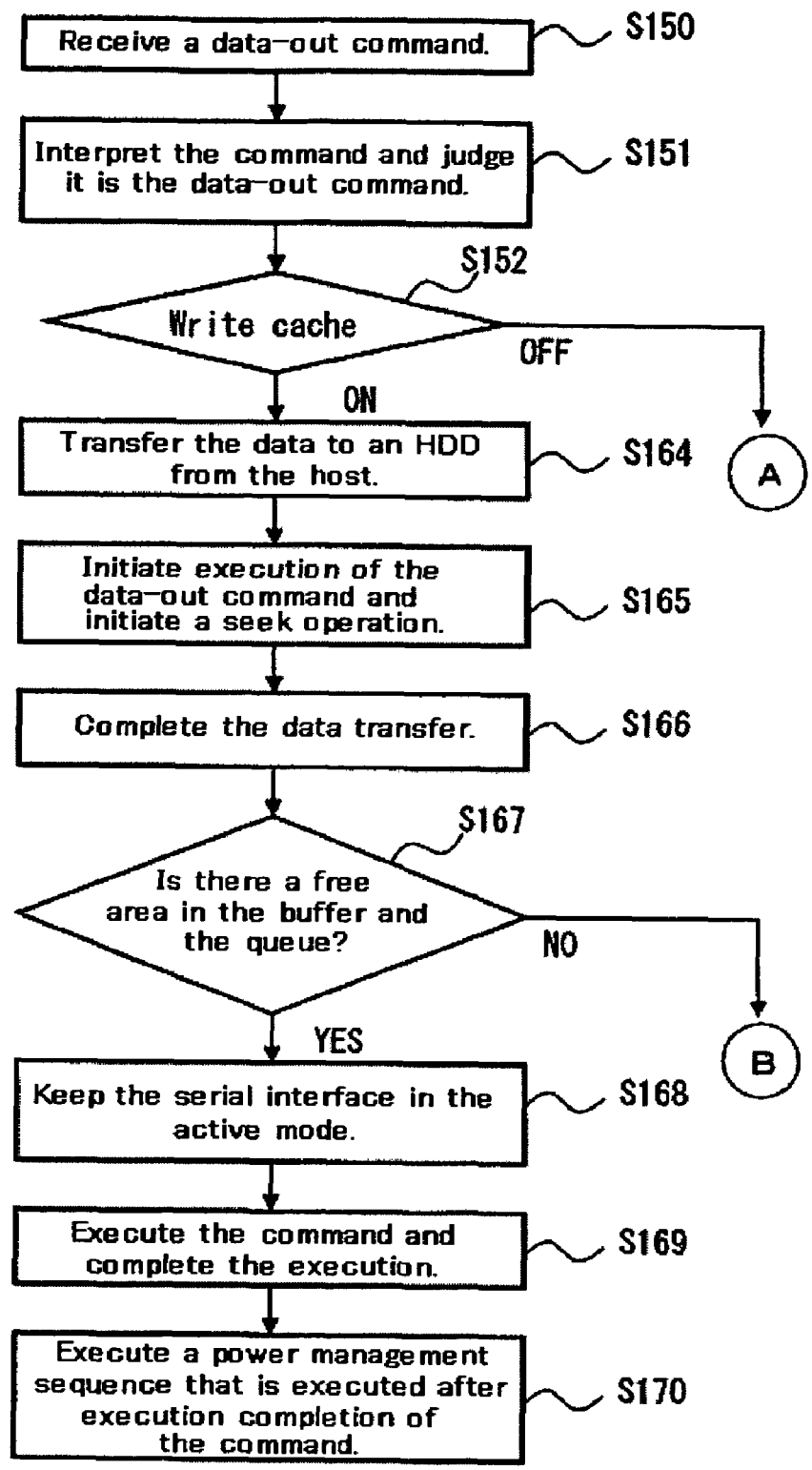
FIG. 7 is a flow chart showing a power management sequence of a serial interface in a sequence to execute a data-out command according to the embodiment.

Referring to FIG. 7, first, upon receiving a data-out command from the host 51 (S150), the HDD 1 interprets the command and judges that the command is a data-out command (S151). Here, a sequence for a case of Write Cache Off (S152) will be described with reference to a flow chart in FIG. 8. Write data is transferred to the HDD 1 from the host 51 (S153). The HDD 1 initiates execution of a data-out command. Specifically, first, a seek operation is initiated (S154). Upon termination of data transfer from the host 51 (S155), the HDD 1 requests the host 51 for an approval for switching the serial interface 236 to the partial suspend mode and acquires the approval (S156). Thereafter, the HDD 1 switches the serial interface 236 to the partial suspend mode (S157).

Upon completion of the seek operation, the HDD 1 writes the transferred data on the magnetic disk 11 (S158). Upon completion of the data writing (S159), the HDD 1 resets the serial interface 236 to the active mode (S160). The HDD 1 transmits an out-of-band signal to the host 51 for requesting switching to the active mode and establishes a serial data communication link with the host 51 (S161).

The HDD 1 notifies the host 51 of the status and completes execution of the Data-out Command (S162). Upon completion of the command execution, the HDD 1 executes the above-stated power management sequence that is executed after the completion of the command execution (S163). It should be noted that resetting of the serial interface 236 to the active mode can also be done before completion of data writing on the magnetic disk 11.

Hereinafter, the case of Write Cache On (S152) will be described with reference to the flow chart in FIG. 7 again. Write data is transferred to the HDD 1 from the host 51 (S164). The HDD 1 initiates execution of a data-out command. Specifically, first, a seek operation is initiated (S165). Upon termination of data transfer (S166), the HDD 1 judges as to whether a free space sufficient to initiate transfer of subsequent write data is available or not, or a free space exists in the queue allocated for the write cache is available or not (S167).

If a free space sufficient to initiate transfer of subsequent data exists in the buffer and a free space exists in the queue allocated to the write cache, the serial interface 236 is retained (S168), during execution of the command, in the active mode without allowing switching to a power-save mode and the data-out command is kept executed and completed (S169). Upon completion of the command execution, the HDD 1 executes the power management sequence that is executed after the completion of the command execution (S170).

On the other hand, at the time point when data transfer is terminated, a free space that is sufficient to initiate transfer of subsequent write data may not be available in the buffer, or no free space may exist in the queue allocated to the write cache (S167). This case will be described with reference to a flow chart in FIG. 9. First, the HDD 1 requests the host 51 for an approval for switching the serial interface 236 to the partial suspend mode and acquires the approval from the host 51 (S171). In responding to the acquisition of the approval, the HDD 1 sets the serial interface 236 to the partial suspend mode (S172). Upon completion of a seek operation, the HDD 1 initiates writing of the data on the magnetic disk 11 (S173).

Upon completion of data writing on the magnetic disk 11 (S174), the HDD 1 resets the serial interface 236 to the active mode (S175). The HDD 1 transmits an out-of-band signal to the host 51 for requesting switching to the active mode and establishes a serial data communication link with the host 51 (S176). Consequently, a free space that is sufficient to initiate transfer of subsequent write data is created in the buffer and a free space also is also created in the queue allocated to the write cache.

Upon completion of the data writing on the magnetic disk 11, the HDD 1 notifies the host 51 of the status, thus completing execution of the data-out command (S177). Upon completion of the command execution, the HDD 1 executes the above-stated power management sequence that is executed after the completion of the command execution (S178).

Hereinafter, a power management sequence for a case where the HDD 1 receives a data-out command will be specifically described in detail. Here, descriptions will be respectively made for a case where a write cache is OFF (Write Cache OFF) and a case where a write cache is ON (Write Cache ON). First, details of a sequence in which the write cache is off will be described. Incidentally, the flow charts of FIGS. 7 and 8 will be referred to as appropriate.

When the analog front-end 361 receives a data-out command from the host 51 (S150), the command is first serial-parallel converted by the deserializer 367 and is then transferred to the I/O controller 234. When the I/O controller 234 notifies the MPU 230 of the command reception, the MPU 230, in responding to the notification of the command reception, interprets the command and judges the command is a data-out command (S151). Upon judging the command is a data-out command, the MPU 230 initiates execution of the data-out command. Specifically, a seek operation is initiated first (S154).

Concurrently with the command execution by the MPU 230, transfer of write data from the host 51 is initiated and the write data is received by the analog front-end 361 (S153). The write data thus received is serial-parallel converted by the deserializer 367 and is then temporarily stored in the buffer via the I/O controller 234. Upon termination of the data transfer (S155), the I/O controller 234 notifies the MUP 230 of the transfer termination.

Responding to the notification of transfer termination, the MPU 230 generates a request for approval for switching to the partial suspend mode and outputs the request to the I/O controller 234. The request for switching approval transferred from the I/O controller 234 is parallel-serial converted by the serializer 366 and is then transferred to the host 51 via the analog front-end 361 (S156). When the host 51 acknowledges an approval for the request (S156), the I/O controller 234 switches the serial interface to the partial suspend mode (S157). Upon completion of the switching, a completion notification of switching to the partial suspend mode is sent to the MPU 230 from the I/O controller 234.

When the seek operation is completed (S158) and the head element 12 arrives at the target sector, the MPU 230 initiates writing of the write data on the magnetic disk 11. The write data stored in the buffer is written on the magnetic disk 11 via the R/W channel (S158).

Upon completion of the writing (S159), the MPU 230 generates a request for approval for switching the serial interface to the active mode and the request is transferred to the I/O controller 234. The I/O controller 234 switches the serial interface to the active mode (S160). The I/O controller 234 outputs an out-of-band control signal to the host 51 via the analog front-end 361 and requests the host 51 for switching (S161). When the serial interface of the host 51 is switched to the active mode, the I/O controller 234 establishes a serial data communication link with the host 51 (S161) and notifies the MPU 230 of the completion of switching to the active mode. The MPU 230 outputs the status to the host 51 through serial data communication, which completes execution of the data-out command (S162). The sequence after the completion of the command execution (S163) is similar to that described above.

Next, a case where the write cache is on (Write Cache On) will be described. As already described earlier, if, after transfer of the write data is terminated, a free space sufficient to initiate transfer of subsequent data exists in the buffer and a free space exists in the queue allocated to the write cache, switching is not made to a power-save mode during command execution. For this reason, hereinafter, a sequence for a case that a free space sufficient to initiate transfer of subsequent data does not exist in the buffer, or a free space does not exist in the queue allocated to the write cache will be described in detail. Flow charts in FIGS. 7 and 9 will be referred to as necessary.

When the analog front-end 361 receives a data-out command from the host 51 (S150), the command is first serial-parallel converted by the deserializer 367 and is then transferred to the I/O controller 234. When the I/O controller 234 notifies the MPU 230 of the command reception, the MPU 230, in responding to the notification of the command reception, interprets the command and judges the command is a data-out command (S151). Upon judging the command is a data-out command, the MPU 230 initiates execution of the data-out command. Specifically, a seek operation is initiated first (S165).

Concurrently with the command execution by the MPU 230, transfer of write data from the host 51 is initiated and the write data is received by the analog front-end 361 (S164). The write data thus received is serial-parallel converted by the deserializer 367 and is then temporarily stored in the buffer via the I/O controller 234. Upon termination of the data transfer (S166), the I/O controller 234 notifies the MUP 230 of the transfer termination.

The MPU 230 judges that a free space sufficient to initiate transfer of subsequent write data does not exist in the buffer or a free space does not exist in the queue allocated to the write cache (S167). The MPU 230 generates a request for approval for switching to the partial suspend mode and outputs the request to the I/O controller 234. The request for switching approval transferred from the I/O controller 234 is parallel-serial converted by the serializer 366 and is then transferred to the host 51 via the analog front-end 361 (S171). When the host 51 acknowledges an approval for the request (S171), the I/O controller 234 switches the serial interface to the partial suspend mode (S172). Upon completion of the switching, a completion notification of switching to the partial suspend mode is sent to the MPU 230 from the I/O controller 234.

When the seek operation is completed and the head element 12 arrives at the target sector, the MPU 230 initiates writing of the write data on the magnetic disk 11. The write data stored in the buffer is written on the magnetic disk 11 via the R/W channel (S173). Upon completion of the writing (S174), a free space that is sufficient to initiate transfer of subsequent write data is created in the buffer and a free space is also created in the queue allocated to the write cache.

Thereafter, the MPU 230 generates a request for approval for switching the serial interface to the active mode and the request is transferred to the I/O controller 234. The I/O controller 234 switches the serial interface to the active mode (S175).

The I/O controller 234 outputs an out-of-band control signal to the host 51 via the analog front-end 361 and requests the host 51 for switching (S176). When the serial interface of the host 51 is switched to the active mode, the I/O controller 234 establishes a serial data communication link with the host 51 and notifies the MPU 230 of the completion of switching to the active mode (S176). The MPU 230 outputs the status to the host 51 through serial data communication, which completes execution of the data-out command (S177). Thereafter, the above-stated sequence after the completion of the command execution is executed (S178).

In the above discussion, the present invention is described by taking the embodiment as an example. However, the present invention is not limited to the above-stated embodiment. For example, the present invention is not limited to the SATA protocol. Further, the relationship between each process and the logical composition is not limited to the above-described example. A designer can design data storage devices by utilizing effective functions and circuit configurations. With the embodiment, the head element 12 is a read/write head that is capable of executing writing and reading processes, but the present invention is also applicable to a read-only device that is designed to be able to remove a recording medium and execute reading only. It should be noted that the present invention is particularly useful for a magnetic disk storage device, but it is also applicable to other modes of storage devices, which drive storage medium, including optical disk storage devices and storage devices using semiconductor recording media.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A control method for a power-save mode of a serial interface in a data storage device that preferentially switches said serial interface to said power-save mode, said control method comprising:
   receiving a command from a host;
   identifying content of said command; and
   setting said serial interface in said power-save mode for at least a period of time during which no sending and receiving of data through serial data communication with the host exists in an execution sequence that is performed in accordance with said command;
   wherein said command is a read command adapted to read out read data from said data storage device, and said serial interface is switched to a power-save mode for at least a partial period of time upon receipt of said read command to movement of a head to a target address of a recording medium on which said read data is recorded.

2. A method according to claim 1,
   wherein said command is a command which does not accompany sending and receiving of user data to and from said host, and said serial interface is switched to a power-save mode in responding to reception of said command.

3. A method according to claim 1,
   wherein said serial interface is switched to said power-save mode after receipt of said read command, and said serial interface is switched to an active mode from said power-save mode after said head arrives at a track of said target address.

4. A control method for a power-save mode of a serial interface in a data storage device that preferentially switches said serial interface to said power-save mode, said control method comprising:
   receiving a command from a host;
   identifying content of said command; and
   setting said serial interface in said power-save mode for at least a period of time during which no sending and receiving of data through serial data communication with the host exists in an execution sequence that is performed in accordance with said command;
   wherein said command is a write command adapted to write write data on a recording medium of said data storage device, and said serial interface is switched to a power-save mode for at least a partial period of time from completion of receiving said write data to completion of writing said write data on the recording medium.

5. A method according to claim 4,
   wherein said serial interface is switched to said power-save mode after completion of said write data reception, and said serial interface is switched to said active mode from said power-save mode after completion of writing of said write data on the recording medium.

6. A method according to claim 4,
   wherein a write cache is OFF in an execution sequence of said write command.

7. A method according to claim 4,
   wherein the execution sequence of said write command is in a state where a write cache is ON and no free space is available in at least one of a buffer adapted to temporarily store said write data and a queue allocated to said write cache.

8. A data storage device which executes sending and receiving of data through serial data communication with a host, said device comprising:
   a serial interface which interfaces serial data communication with said host and preferentially makes switching to a power-save mode; and
   a controller which identifies content of a command received from said host and controls a command execution sequence;
   wherein said serial interface is set to said power-save mode for at least a partial period of time during which no sending and receiving of data exists through serial data communication with said host;
   wherein said serial interface is set to a power-save mode for at least a partial period of time upon receipt of a read command adapted to read out read data from said data storage device to movement of a head to a target address of a recording medium on which said read data is recorded.

9. A data storage device according to claim 8,
   wherein said serial interface is switched to said power-save mode in responding to reception of a command which does not accompany sending and receiving of user data to and from said host.

10. A data storage device according to claim 8,
    wherein, if read data associating with the read command received is stored in a cache, said serial interface is retained in an active mode and transmits the data transferred from said cache to said host.

11. A data storage device which executes sending and receiving of data through serial data communication with a host, said device comprising:
    a serial interface which interfaces serial data communication with said host and preferentially makes switching to a power-save mode; and
    a controller which identifies content of a command received from said host and controls a command execution sequence;
    wherein said serial interface is set to said power-save mode for at least a partial period of time during which no sending and receiving of data exists through serial data communication with said host;
    wherein, in an execution sequence for a write command adapted to write data, said serial interface is set to a power-save mode for at least a partial period of time from completion of write data reception to completion of writing said write data on a recording medium.

12. A data storage device according to claim 8,
wherein, in an execution sequence of a write command, for a case where a write cache is OFF, said serial interface is set to a power-save mode for at least a partial period of time from completion of write data reception to completion of writing said write data on a recording medium, and for a case where the write cache is ON, a free space is available in a buffer adapted to temporarily store write data and further a free space is available in a queue of the write cache, said serial interface is retained in the active mode in the write command sequence.

* * * * *